United States Patent
Bates et al.

(10) Patent No.: US 6,634,020 B1
(45) Date of Patent: Oct. 14, 2003

(54) UNINITIALIZED MEMORY WATCH

(75) Inventors: Cary Lee Bates, Rochester, MN (US); Victor John Gettler, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,344

(22) Filed: Mar. 24, 2000

(51) Int. Cl.[7] .............................. G06F 9/44; G06F 9/00
(52) U.S. Cl. .................. 717/131; 717/124; 717/127; 717/129; 717/130; 712/227
(58) Field of Search .................. 717/124, 125, 717/127, 129, 130, 131; 714/25, 37, 38, 40, 42; 712/227, 244

(56) References Cited

U.S. PATENT DOCUMENTS

| | | | | |
|---|---|---|---|---|
| 5,193,180 A | | 3/1993 | Hastings | 395/575 |
| 5,295,260 A | * | 3/1994 | Pribnow | 714/25 |
| 5,335,344 A | | 8/1994 | Hastings | 395/575 |
| 5,446,900 A | * | 8/1995 | Kimelman | 717/124 |
| 5,598,553 A | * | 1/1997 | Richter et al. | 703/23 |
| 5,611,043 A | * | 3/1997 | Even et al. | 714/38 |
| 5,613,063 A | * | 3/1997 | Eustace et al. | 714/38 |
| 5,644,709 A | * | 7/1997 | Austin | 714/53 |
| 5,754,839 A | * | 5/1998 | Pardo et al. | 717/129 |
| 5,870,606 A | * | 2/1999 | Lindsey | 717/128 |
| 5,896,536 A | * | 4/1999 | Lindsey | 717/128 |
| 5,907,709 A | | 5/1999 | Cantey et al. | 395/705 |
| 5,949,972 A | | 9/1999 | Applegate | 395/185.07 |
| 5,953,530 A | | 9/1999 | Rishi et al. | 395/704 |
| 6,175,913 B1 | * | 1/2001 | Chesters et al. | 717/227 |
| 6,249,907 B1 | * | 6/2001 | Carter et al. | 717/129 |
| 6,295,613 B1 | * | 9/2001 | Bates et al. | 714/38 |
| 6,351,845 B1 | * | 2/2002 | Hinker et al. | 717/128 |

* cited by examiner

Primary Examiner—Gregory Morse
Assistant Examiner—Eric B. Kiss
(74) Attorney, Agent, or Firm—Moser, Patterson & Sheridan, L.L.P

(57) ABSTRACT

In the present invention, a special purpose watch function is used to find reference to uninitialized memory within a computer program during debugging. The uninitialized memory watch may be implemented singularly with respect to a given memory allocation or as a watchpoint wherein a watch is set on a memory space for each instance of a memory allocation during execution of a program. At the point where this watch is set, the program assumes that the memory targeted is uninitialized. When storage to the target memory is made, the watch function marks that segment of memory as initialized and permits continued program execution. Upon detecting a reference to the memory, a determination is made as to whether the watched memory space is initialized.

44 Claims, 7 Drawing Sheets

| WATCH NUMBER | WATCH ADDRESS | # BYTES WATCHED | POINTER TO DCODE PROGRAM | BP ADDRESS | OP CODE | WATCH PT | BIT VECTOR |
|---|---|---|---|---|---|---|---|
| 1 | 87909724 | 3 | DCODE A | | | | 111 |
| 2 | 88100711 | 5 | DCODE B | 1234565 | AB | YES | 01011 |
| 2 | 88101111 | 5 | DCODE B | 1234565 | AB | YES | 11100 |
| 2 | 89000179 | 5 | DCODE B | 1234565 | AB | YES | 00000 |
| 3 | | | DCODE B | 1237771 | AC | YES | |
| | 32b | 32c | 32d | 32e | 32f | 32g | 32h |

UNINITIALIZED MEMORY WATCH

BACKGROUND OF THE INVENTION

1. Field of the Invention

The present invention relates to computers and computer software. More specifically, the invention is generally related to debugging software.

2. Background of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"), commonly located on and executed by the same computer system on which the program is executed, Conventional debuggers typically support two primary operations to assist a computer programmer. Each operation allows the programmer to examine the state of program registers and variables at a given point in the execution of a program. A first operation supported by conventional debuggers is a "step" function, which permits a computer programmer to process instructions in a computer program at a source file level (i.e., line by line) and at a statement level, and see the results upon completion of each instruction. While the step operation provides a programmer with a large amount of information about a program during its execution, stepping through hundreds or thousands of program instructions can be extremely tedious and time consuming. A programmer may be required to step through many program instructions that are known to be error-free before a set of instructions to be analyzed are executed.

A second operation supported by conventional debuggers is a breakpoint operation. A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

Typically, step operations and breakpoints are used together to simplify the debugging process. Specifically, a common debugging operation is to set a breakpoint at the beginning of a desired set of instructions to be analyzed, and then execute the program. Once the breakpoint is reached, the program is halted, and the programmer then steps through the desired set of instructions line by line using the step operation. Consequently, a programmer is able to isolate and analyze a particular set of instructions without having to step through irrelevant portions of a computer program.

One of the most difficult problems to debug is when a program reads from uninitialized memory. As a program code is converted into binary instructions, memory for variables is set aside. Uninitialized memory refers to memory that is not given initial values. Problems with uninitialized memory can manifest themselves in different ways, costing loss of programmer productivity. For example, variables may be assigned random values when they are uninitialized that cause errors which are not immediately transparent.

One attempt to debug memory-related errors is to purposefully introduce a "funny value," or garbage, into the memory. In some cases, the funny value will be utilized during the execution of the program and result in output alerting the programmer to a potential memory related problem. However, in practice, the funny value selected by the programmer does not necessarily produce an expected error. Thus, the programmer can never be certain that a given output is the result of the funny value being accessed from memory. In addition, even when recognizable output is produced, the output often does not occur until much later in the execution of the program relative to when the funny value was actually used. Thus, the programmer is unable to determine where in the source code the error is located.

Another method which can be used to locate the location of a read from uninitialized memory limited situations is a compiler generated warning message notifying the user of the reference to the memory. However, this method does not detect all references to uninitialized memory. This limitation results because modules are compiled separately so the compiler doesn't "know" what variables may be set by a call to a procedure in another module. Further, variable values that affect control flow can come from sources external to the compiler such as data files and user input. As a result, it is impossible for the compiler to diagnose anything but the simplest of situations where a variable is referenced before its value is set.

In another method, referred to herein as the "object code insertion" ("OCI") method, checking instructions are inserted in the program's object files, between instructions that reference memory, to monitor the program's memory reads and writes. The executable contains a call to malloc and a reference of the allocated memory. After the call to malloc and before the following memory-reference instruction, control transfers to a checking function and then returns at its conclusion to the original executable. This method also uses a malloc wrapper to monitor the program's memory allocations and frees.

One problem with the OCI method is that it requires a special build of the program, in which checking instructions are inserted between the program's normal instructions. The OCI method also suffers from performance degradation because performing a function call and looking up data structures during every memory-reference instruction in a program will necessarily have a severe impact on performance. Experienced users may often intuit that uninitialized memory is being referenced. In this case, the users don't require that all memory being allocated in the program be tested as is done with the OCI method. Rather, the user requires a method and apparatus to pinpoint the exact location of the reference on the suspect memory space.

Moreover, the OCI method performs function calls and data structure references in-between a program's normal instructions, which results in poor locality and few cache hits on modern CPU architectures that utilize on-chip caches, resulting in further performance degradation. In addition, the OCI method provides excessive information, requiring more overhead time on the part of the user to sift through the output data to locate relevant information.

Therefore, there is a need for a debugging program adapted to address the problems associated with uninitialized memory.

SUMMARY OF THE INVENTION

The present invention generally provides an apparatus, program product, and a method for debugging computer programs that monitors reads and writes to uninitialized memory.

In one aspect of the invention, a method for debugging code is provided, comprising, setting an uninitialized memory control point on at least one memory space, wherein the uninitialized memory control point is adapted to cause detection of a reference to the memory space during execution of the code. When the reference is made to the memory space during execution of the code, the method determines whether the memory space is initialized; and if the memory space is not initialized when the reference is made, a result is returned to a user interface indicating that the reference was made.

In another aspect of the invention, a method for debugging code is provided, comprising, allocating at least one memory space having a memory address range and setting an uninitialized memory watch on the memory space, which is triggered when a reference is made to the memory space. If the reference is a write, a first Dcode is executed to mark the memory space as initialized. If the reference is a read, a second Dcode is executed to determine whether the memory space is initialized. If the memory space is not initialized when the read is made, a result is returned to a user interface indicating the reference.

In another aspect of the invention, a program product comprising a computer readable medium bearing a debugging program is provided. When executed the debugging program causes steps to be performed, the steps comprising, allocating at least one memory space in a memory and setting an uninitialized memory watch on the memory space, which is triggered when a reference is made to the memory space during execution of a target program. If the reference is a write, a first Dcode is executed to mark the memory space as initialized. If the reference is a read, a second Dcode is executed to determine whether the memory space is initialized. If the memory space is not initialized when the read is made, a result is returned to a user interface indicating the reference.

In another aspect of the invention, a computer system comprising a memory and a processor configured for providing a system exception in response to references to the memory is provided wherein a method debugging a program is executing in the processor. The method comprises allocating at least one memory space in the memory; setting an uninitialized memory watch on the memory space, wherein when a reference is made to the memory space the uninitialized memory watch is triggered and causes the processor to provide the system exception; executing, by the processor, a first Dcode to mark the memory space as initialized if the reference is a write; and executing, by the processor, a second Dcode to determine whether the memory space is initialized if the reference is a read. If the memory space is not initialized when the read is made, a result is returned to a user interface indicating the reference.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a data structure of a control point table.

DETAILED DESCRIPTION OF THE PREFERRED EMBODIMENT

The preferred embodiment of the present invention generally provides a method and apparatus for debugging computer programs. Debugging computer programs is aided by identifying, setting and monitoring uninitialized memory watches and uninitialized memory watchpoints (also referred to herein as "watchpoints"). An uninitialized memory watch is a control point set by a user on a specific memory space to determine when a reference (reads and writes) is made to the memory prior to initialization. Watchpoints are control points inserted into a computer program which set an uninitialized memory watch for each instance the watchpoint address is hit. The uninitialized memory watches then monitor reads and writes to memory which is assumed to be uninitialized at the time of allocation.

Once a watch for uninitialized memory is established, this capability may enhance a debug user interface in a number of possible manners. For example, uninitialized memory addresses may be highlighted. Also, program execution may be halted once a load to an uninitialized memory is made and the user informed of the memory location and the location in the program the load occurred.

By monitoring references to uninitialized memory, a number of advantages are realized. For example, the user can quickly determine the point in a program where references to uninitialized memory occurs and can debug it directly. The "real-time" debugging capability obviates latent problems which would otherwise surface later during the execution of the program. In one embodiment, the user may be informed about watches that are removed as memory is initialized and resources associated with the watch are removed.

Figure 1:
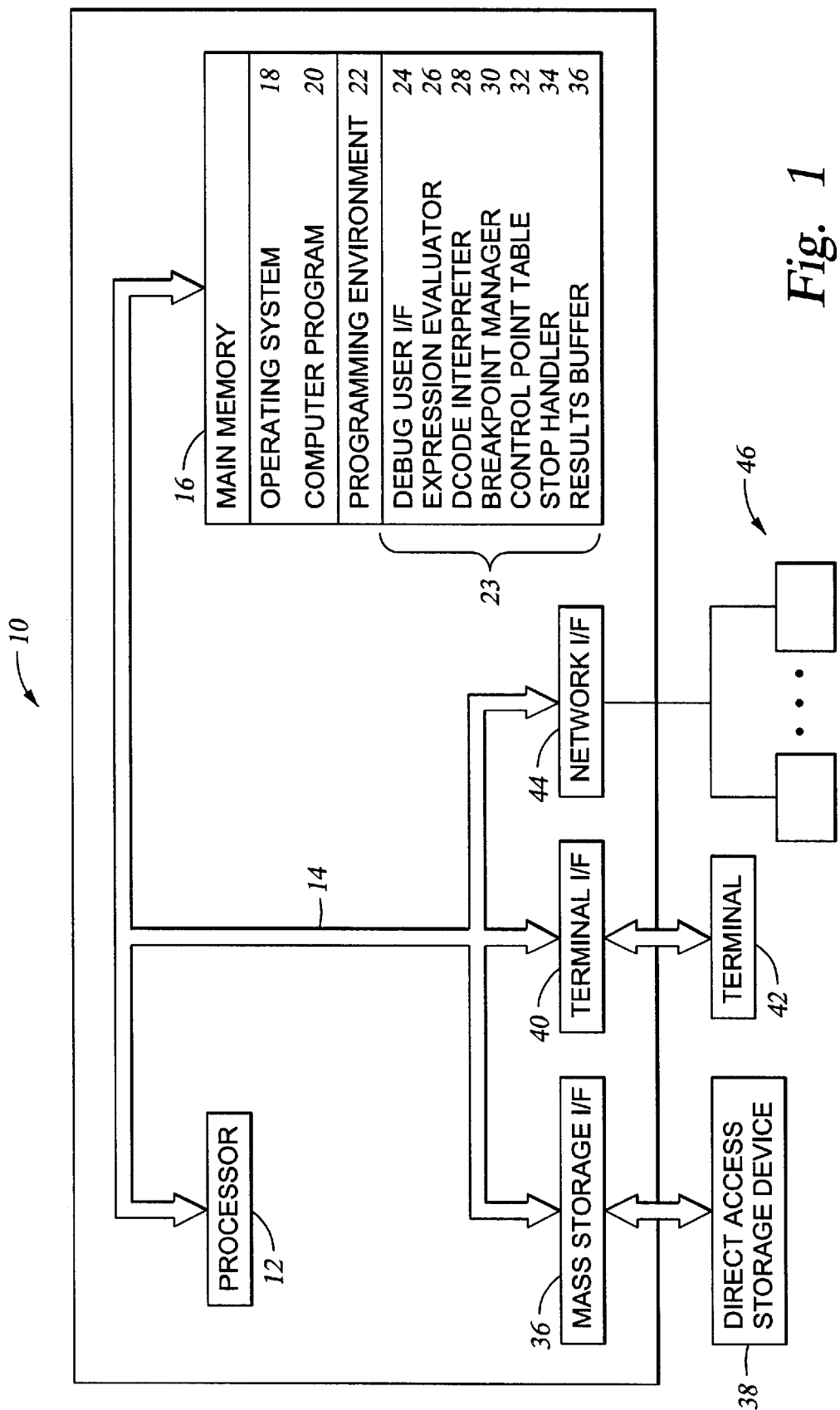
FIG. 1 is a high-level diagram of a computer system consistent with the invention.

Referring now to FIG. 1, a computer system 10 consistent with the invention is shown. For purposes of the invention, computer system 10 may represent any type of computer, computer system or other programmable electronic device, including a client computer, a server computer, a portable computer, an embedded controller, etc. The computer system 10 may be a standalone device or networked into a larger system. In one embodiment, the computer system 10 is an AS/400 available from International Business Machines of Armonk, N.Y.

Computer system 10 is shown for a multi-user programming environment that includes at least one processor 12, which obtains instructions, or operation codes, (also known as op codes), and data via a bus 14 from a main memory 16. The processor 12 could be a PC-based server, a minicomputer, a midrange computer, a mainframe computer, etc. adapted to support the debugging methods, apparatus and article of manufacture of the invention. In particular, the computer processor 12 is selected to support monitoring of memory references according to user-issued commands. One method of monitoring memory supported by various processors known in the art is a "watch." As used herein, a watch is a hardware directed event such that when memory is modified, by a store for example, the watch will fire. Such a watch does not require a modification of object code. This mechanism is used to advantage by the present invention. Thus, the processor 12 is watch-enabled. Illustratively, the processor is a PowerPC available from International Business Machines of Armonk, N.Y.

The main memory 16 includes an operating system 18, a computer program 20, and a programming environment 22. The main memory 16 could be one or a combination of memory devices, including Random Access Memory, non-volatile or backup memory, (e.g., programmable or Flash memories, read-only memories, etc.). In addition, memory 16 may be considered to include memory physically located elsewhere in a computer system 10, for example, any storage capacity used as virtual memory or stored on a mass storage device or on another computer coupled to the computer system 10 via bus 14.

The programming environment 22 facilitates debugging the computer program 20, or computer code, by providing tools for locating, analyzing and correcting faults. One such tool is a debugger program 23 that comprises a debugger user interface 24, expression evaluator 26, Dcode interpreter 29, control point manager (referred to herein as "breakpoint manager 30"), control point table 32, debugger stop handler 34, and result buffer 36. In one embodiment, the debugger 23 is a VisualAge® for Java™ debugger modified according to the invention. VisualAge® for Java™ is available from International Business Machines of Armonk, N.Y.

The computer system 10 could include a number of operators and peripheral systems as shown, for example, by a mass storage interface 36 operably connected to a direct access storage device 38, by a terminal interface 40 operably connected to a terminal 42, and by a network interface 44 operably connected to a plurality of networked devices 46. The terminal 42 and networked devices 46 could be desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
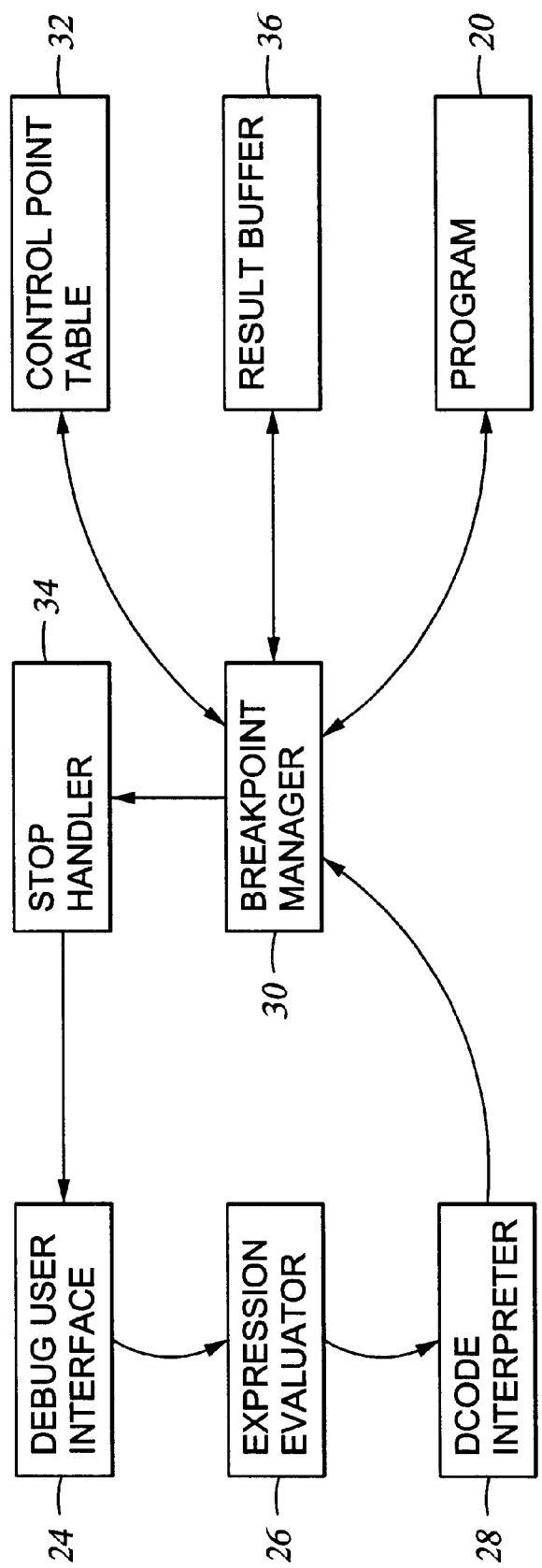
FIG. 2 is a block diagram of an exemplary debugger software environment.

The operational relationship of the debugger program 23 may be understood with reference to FIG. 2 which provides an exemplary software environment for the computer system 10 of FIG. 1. The debugging capability is illustrated in block diagram form, with the elements shown that contribute to maintaining control points (e.g., creating and deleting) and to responding to a system exception. Although shown as separate components, it is understood that one or more of the components may be combined. A debugging process is initiated by the debug user interface 24. The user interface 24 presents the program under debugging and highlights the current line of the program on which a stop or error occurs. The user interface 24 allows the user to set control points, display, and change variable values by inputting the appropriate commands. The control points of the present invention include watches and watchpoints set on memory spaces. The watches and watchpoints are configured to monitor reads (loads) and writes (stores) made to memory and trigger a response notifying a user of reads from uninitialized memory. In some instances, the user may define the control points by referring to high-order language (HOL) references such as line or statement numbers or software object references such as a program or module name, from which the physical memory address may be cross referenced.

The expression evaluator 26 parses the debugger command passed from the user interface 24 and uses a table generated by a compiler to map the line number in the debugger command to the physical memory address in memory 16. In addition, the expression evaluator 26 generates a Dcode program for the command. The Dcode program is machine executable language that emulates the commands. Some embodiments of the invention include Dcodes, which when executed, set watches and watchpoints as will be described in more detail below.

The Dcode generated by the expression evaluator 26 is executed by the Dcode interpreter 28. The interpreter 28 handles expressions and Dcode instructions to set control points and perform other debugging steps. Results from Deode interpreter 28 are returned to the user interface 24 through the expression evaluator 26. In addition, the Dcode interpreter 28 passes on control point information to the breakpoint manager 30, which takes steps to set (and later handle) the control points and update the control point table 32. In addition, the breakpoint manager 30 sets and handles conventional debugging control points such as breakpoints.

After the control points are set, the user provides an input that resumes execution of the program 20. Execution of the program eventually results in an encounter of a control point. The breakpoint manager 30 is then called and references the control point table 32 in order to determine the type of control point encountered and the associated processing. The breakpoint manager 30 then calls the stop handler 34 and program execution is halted. The stop handler 34 is a code segment that returns control to the appropriate user interface. This allows programming in an operation having multiple interfaces. The stop handler 34 prompts the debug user interface 24 and may pass the results to the user interface 24. Alternatively, the results may be passed to the result buffer 36 to cache data for the user interface 24.

In one embodiment, the control point information is contained in a data structure such as control point table 32. An illustrative control point table 32 is shown in FIG. 3. Fields provided for each watch record include a watch number 32a and the address field 32b containing the base address of the physical memory location being watched. The watch number 32a provides a convenient identifier for a particular watch which has been set by the breakpoint manager 30. The address field 32b may correspond to the location of any memory type including static memory (e.g., for global variables), dynamic memory (e.g., heap memory) and automatic memory (e.g., stack memory). The address field 32b is referenced when a system exception occurs at a specific address. If the specific address is in the control point table 32, then the system exception is presumed to have occurred due to the insertion of a control point at this point in the computer program.

The control point table 32 also includes a "bytes watched" field 32c, "a pointer to the Dcode program" field 32d, a "breakpoint address" field 32e, an opcode field 32f, a watchpoint field 32g and a "bit vector" field 32h. Field 32c contains the number of bytes watched from the base address contained in the address field 32b. Field 32d contains a pointer to the appropriate Dcode program which is executed when the control point at the respective address is encountered. In one embodiment, Dcodes for uninitialized memory watches and uninitialized memory watchpoints are provided in addition to conventional Dcodes for functions such as breakpoints, stepping and the like. Field 32e contains the address of the breakpoint (i.e., the location in the code of the target program where the user desires execution to halt). The opcode field 32f stores the original opcode or instruction that is replaced in the computer program in the case of a watchpoint or a breakpoint. The watchpoint field 32g is used to indicate that a watchpoint has been set on the watched address (contained in field 32b). The bit vector field 32h provides a storage area for values indicating whether the memory being watched has been initialized, i.e., stored to. In one embodiment, each byte being watched is represented by a single bit. By default a zero (0) value indicates that the corresponding bit has not been stored to. In one embodiment, padding is accounted for such that the padding bit(s) is considered initialized with the non-padding bit(s) to prevent a false error when a read is made from a memory space in which the non-padding bit(s) had been initialized.

Fields 32a–d are populated with information related to watches and watchpoints. Fields 32d–g are populated with information relating only to watchpoints. Thus, in the case of watches, fields 32d–g remain empty. Fields 32d–f are populated with information relating to breakpoints. The first entry (identified as watch one (1)) in the control point table 32 of FIG. 3 illustrates a watch entry. The second and third entries (identified as watch two (2) and three (3)) illustrate watchpoint entries.

As will be described in detail below, a first phase of the watchpoint involves setting a control point which, when triggered, calls the debug program 23. In one embodiment, the processing logic for setting the control points in the first phase of a watchpoint involves the same or similar logic to that used for setting breakpoints. For clarity, the control points set in the first phase of a watchpoint are referred to herein as breakpoints (the address for the breakpoints associated with a watchpoint are stored in the breakpoint address field 32e). In a second phase, an uninitialized memory watch is set and associated with the memory address specified by the watchpoint. This address is stored to the watch address field 32b. The entry for the second watch (watch 2) illustrates the state of the control point table 32 entry after a watchpoint has been set and handled (i.e., encountered during the execution of the program 20), resulting in a watch being set on the associated memory. Thus, all fields are filled. Further, because a watchpoint can be fired multiple times (one for each time the associated breakpoint is encountered), multiple entries exist for the second watch. Fields 32d–g contain the same information because a watchpoint is set for a given address (represented by the information in the breakpoint address field 32e) in the code being debugged. Field 32b is necessarily different because new memory will be allocated each time the code on which the watchpoint is set is executed. The "number of bytes watched" field 32c will typically be the same. However, in a dynamic environment, such as one using Java™, the entry for field 32c may vary for each instance a given watchpoint is fired. The entry for the third watch (watch 3) illustrates the state of the control point table 32 after a breakpoint has been set for a watchpoint but before being handled (i.e., encountered). Thus, the fields 32b–c are empty. The fields 32b–c will be filled upon encountering the breakpoint.

It should be appreciated that the table 32 is merely for illustration. Other embodiments would provide fewer or more control point data fields. For example, the table 32 may also contain information for conventional control points such as breakpoints. In addition, this information could be contained in two or more data structures rather than in a single data structure.

Figure 4:
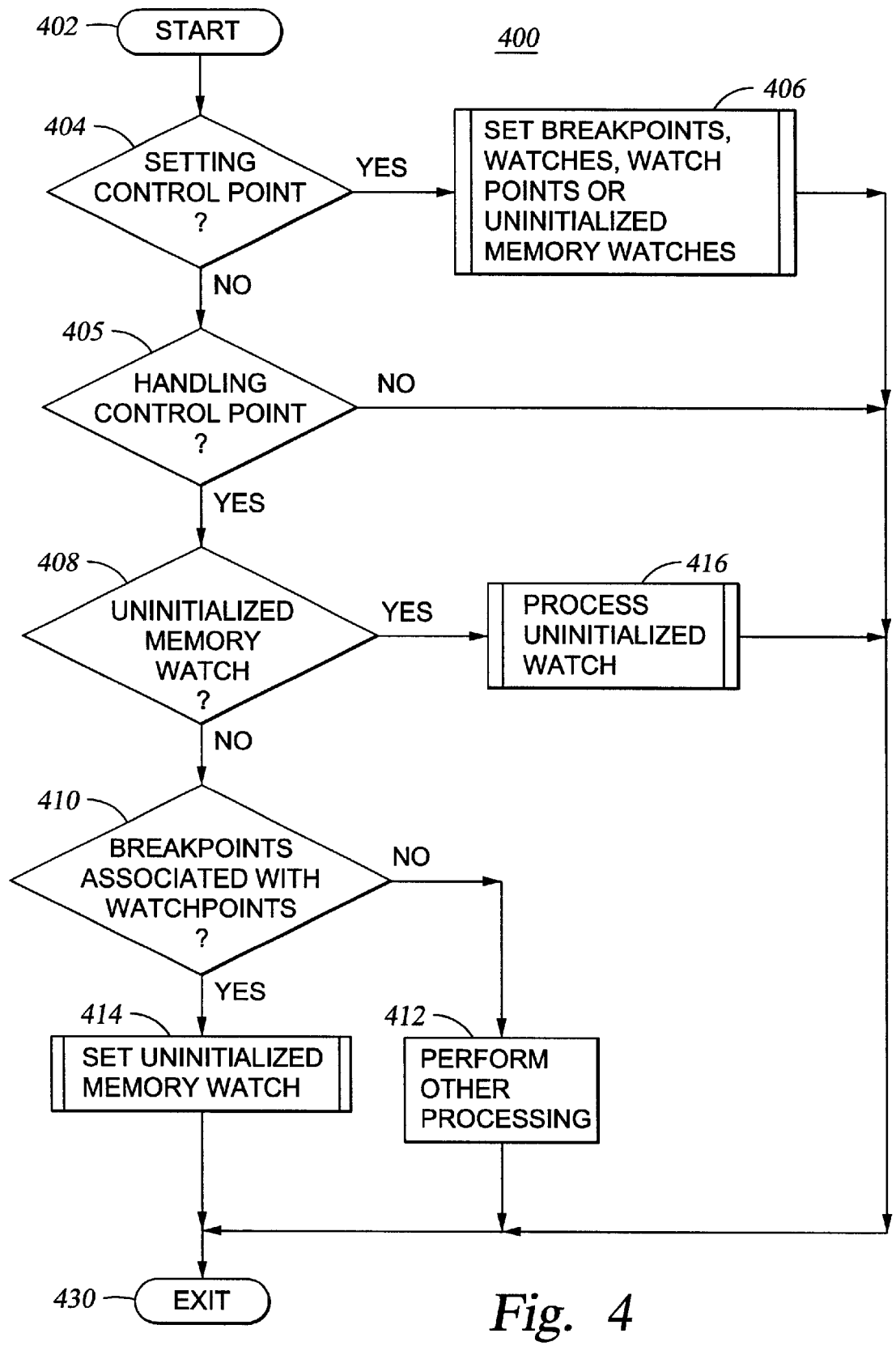
FIG. 4 is a flow diagram of a control point manager routine.

Referring to FIG. 4, a method 400 illustrating the operation of the breakpoint manager 30 is shown. The method 400 provides for maintaining control points and responding to a system exception, although the breakpoint manager may include other routines. The method 400 is entered at step 402, which may correspond to any event calling the breakpoint manager 30. At step 404 a determination is made as to whether the event is setting a control point. If so, then at step 406 the breakpoint manager 30 takes steps to set the appropriate control point (e.g., uninitialized memory watches or watchpoints). The method 400 then exits at step 430.

Figure 5:
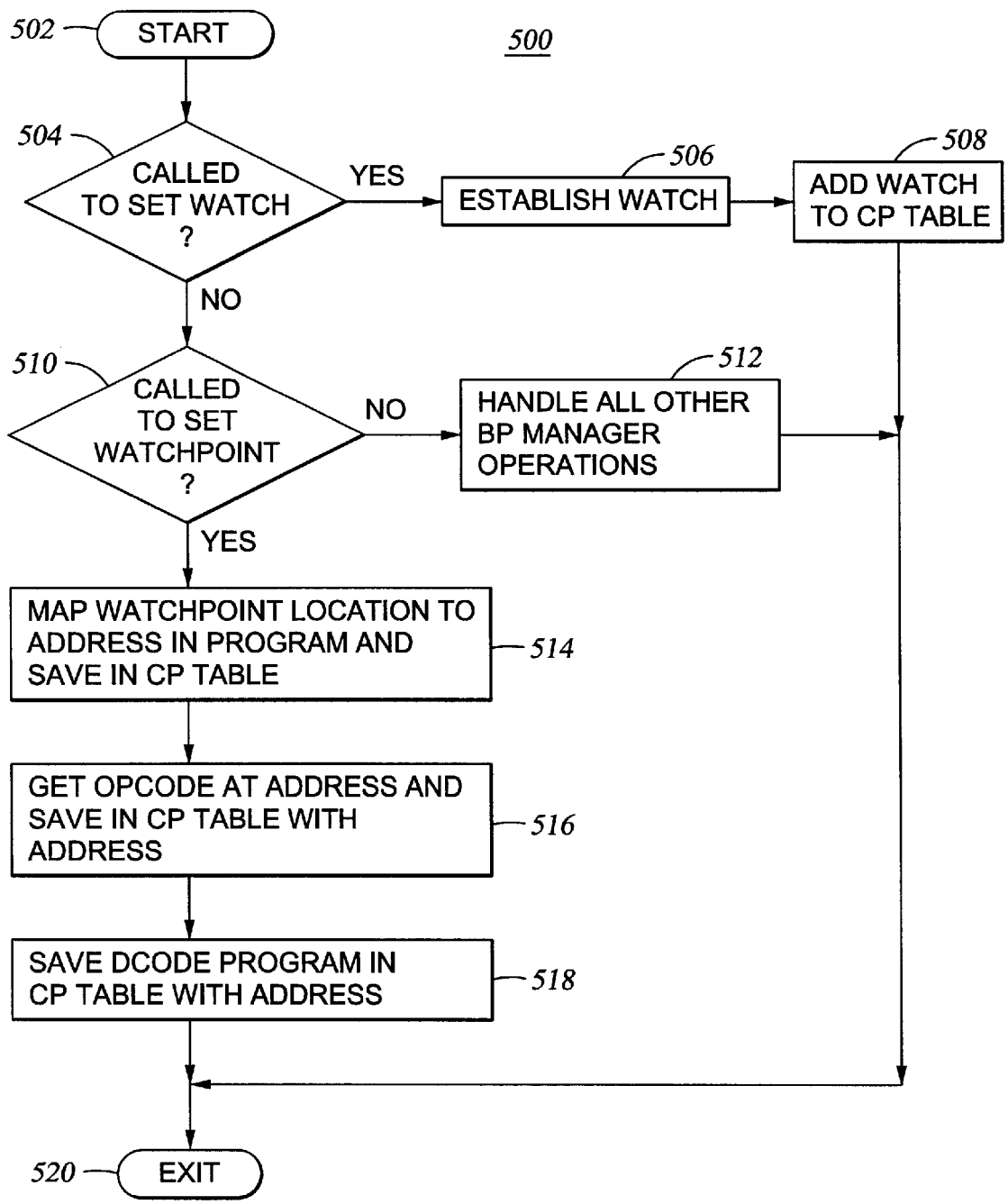
FIG. 5 is a flow diagram of a control point manager routine for setting and handling uninitialized memory watches and watchpoints.

Referring now to FIG. 5, an embodiment of a method 500 for setting uninitialized memory watches and watchpoints (step 406 of FIG. 4) is shown. At the time either control point is set, the memory space at issue is assumed to be uninitialized. Uninitialized memory refers to allocated memory that has not been given an initial value as a result of a storage action to the memory.

The method 500 is entered at step 502. At step 504 the method 500 queries whether the breakpoint manager 30 has been called to set an uninitialized memory watch. If so, the method 500 establishes a watch at step 506. Setting the watch is initiated by the user (programmer) who simply stops the program 20 at a point where memory has just been allocated, such as after a malloc( ) statement or at the end of a user supplied allocator. The user then sets an uninitialized memory watch on the memory that was just allocated. In one embodiment, the uninitialized memory watch is established in response to a user-supplied command using a low level system function supported by the watch-enabled processor 12. One example of a user command issued to set an uninitialized memory watch is: UNWCHPT record_pointer. "Record_pointer" is a language expression which either evaluates to be a pointer type (pointing to the allocated memory on which the watch is set) or must be an lvalue, in which case the address of the data is used to establish the location of the uninitialized memory watch. Thus, the expression evaluator 26 creates an appropriate Dcode program by resolving the expression. The memory location to be watched is then computed by the Dcode interpreter 28 executing the Dcode program. At step 508, the watch is added to the control point table 32. Accordingly, the control point table fields 32a–d are populated.

If, at step 504, the breakpoint manager 30 is not called to set a watch, the method 500 queries whether the event encountered is to set a watchpoint at step 510. If not, then the method 500 handles all other breakpoint manager operations at step 512. Other breakpoint manager operations include setting and removing breakpoints, hitting breakpoints and stepping.

If the event at step 510 is to set a watchpoint, then the method 500 proceeds to set a trap using the same or similar logic as that used in setting a breakpoint. The watchpoint may be set in response to a user-supplied command. One example of a user command issued to set an uninitialized memory watchpoint is: UNWCHPT 123 record_pointer. "123" represents the line number in the source code where memory has been allocated (typically the previous line in the code). The remaining portion of the command is similar to the UNWCH command described above and is executed in a similar manner. Specifically, the memory location to be watched is then computed executing the Dcode program which, in turn, was generated based on the expression in the command.

For each instance the uninitialized watchpoint is encountered during the execution of the code, a watch is set on the allocated memory pointed to by the evaluated "record_pointer" expression. The particular implementation of the uninitialized memory watchpoint is not limiting of the invention and those skilled in the art will recognize alternative embodiments.

One embodiment for setting a watchpoint is described with reference to step 514, 516 and 518. At step 514, the watchpoint location is mapped to the address in the program. The address information is then stored to field 32e of the control point table 32. At step 516, the method 500 operates to store the opcode located at the address in the program to field 32f of the control point table 32. This valid opcode is replaced with an invalid opcode in the program 20 that will trigger the watchpoint and call the breakpoint manager 30 when it is encountered. At step 518, the appropriate Dcode program is stored to the control point table 32 and associated with the address in the target program 20 at which the watchpoint (and hence, the breakpoint) is set. At step 520, the method 500 ends indicating that step 406 of FIG. 4 is completed.

Thus, in the case of setting a watchpoint (steps 514, 516 and 518), the user sets breakpoints (or similar control points) at desired locations in the program 20 being debugged and then executes the program 20. Upon encountering the breakpoints, the debug program 23 will operate to set uninitialized memory watches at the memory locations associated with the breakpoints. Setting the uninitialized memory watch for a watchpoint is described with reference to step 414 below.

If the event at step 404 is not setting a control point, then the method 400 queries at step 405 whether the event is handling a previously set control point which has been encountered during execution of the target program 20 being debugged. Thus, when an exception is fired the breakpoint manager 30 is informed and is given the address at which the event occurred. The breakpoint manager 30 then determines whether the address is one that the breakpoint manager 30 is handling. If not, then the method 400 is exited at step 430.

If the event is handling a control point that the breakpoint manager is controlling, then at step 408, it is determined if the control point is an uninitialized memory watch. In one embodiment, an uninitialized memory watch may be the result of a singular condition set by a user (steps 506, 508 of FIG. 5) to monitor a specific memory space or may be the result of a watchpoint. In the case of a watchpoint, the breakpoint was set at steps 514, 516, and 518. An uninitialized memory watch associated with the breakpoint is then set at step 414 described below.

If the control point at step 408 is not an uninitialized memory watch (whether set as a singular condition by a user at steps 506, 508 or as a result of a watchpoint at steps 514, 516, 518 of FIG. 5 and step 414 of FIG. 4) the method 400 proceeds to step 410. At step 410 a determination is made whether the control point is a breakpoint associated with watchpoints. That is, the method 400 determines whether the control point is a breakpoint set at steps 514, 516 and 518. If not, the breakpoint manager 30 continues to perform other processing at step 412. If the control point is a breakpoint associated with a watchpoint, then at step 414 the manager 30 sets an uninitialized memory watch on the target address of the program 20. The target address is the memory address which has just been allocated by the target computer program 20 during its execution. The allocation may have been the result of a malloc call or a user supplied allocator. The method 400 exits at step 430 allowing the program to continue running. During the next iteration of method 400, the breakpoint manager 30 will encounter an uninitialized memory watch at each address in the program 20 where a watch was set at step 414. The detection of each uninitialized memory watch will be made at step 408 as described above.

If the control point is an uninitialized memory watch at step 408, the watch is processed at step 416. The method 400 is then exited at step 430.

Figure 6:
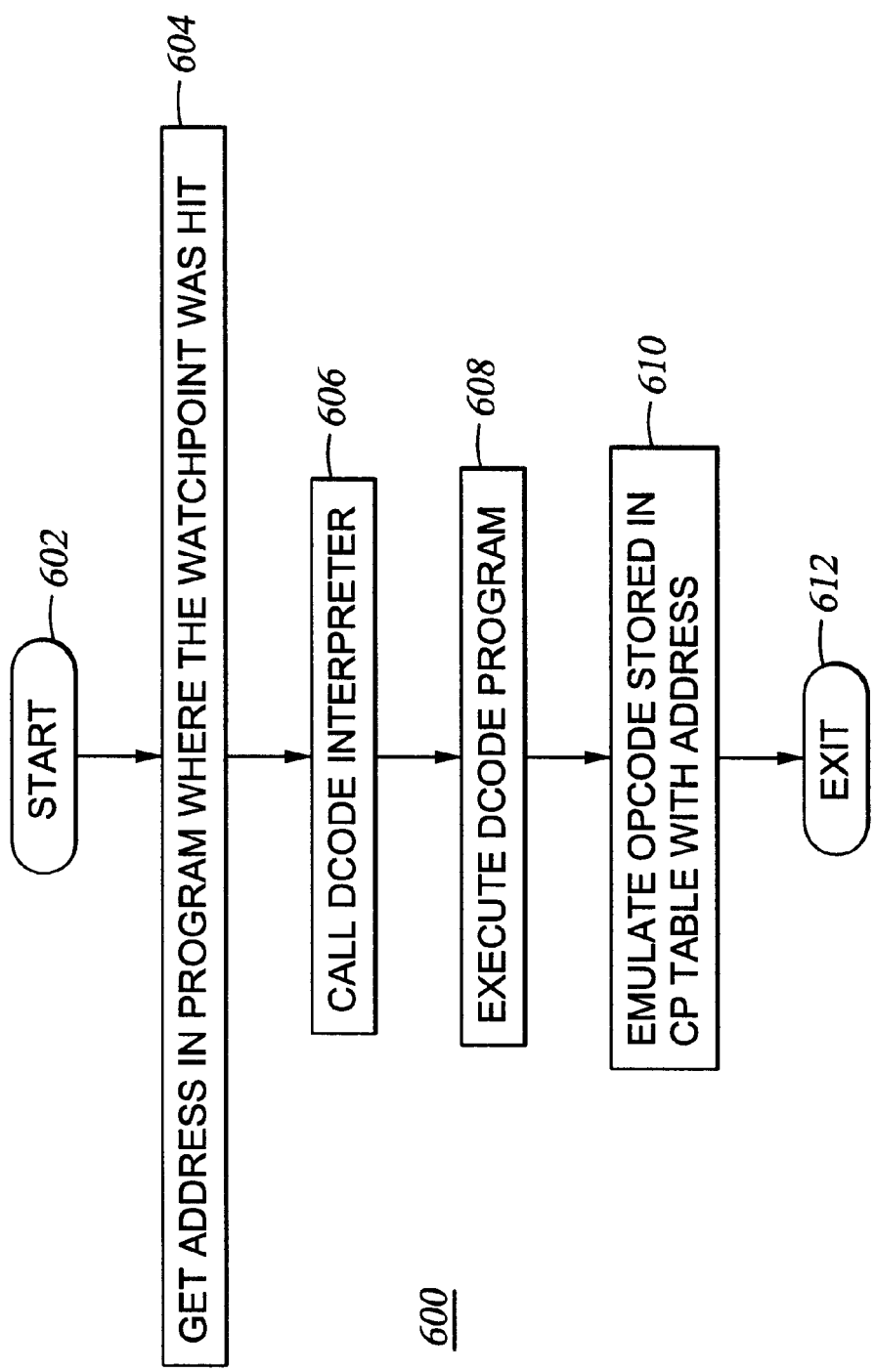
FIG. 6 is a flow diagram illustrating one embodiment for setting uninitialized memory watches for a watchpoint.

One embodiment of setting an uninitialized memory watch for a watchpoint (step 414) is shown as method 600 in FIG. 6. Method 600 is entered at step 602. At step 604, the breakpoint manager 30 retrieves the address in the program 20 where the watchpoint was encountered. This address is used by the breakpoint manager 30 to access the appropriate entry in the control point table 32. At step 606, the breakpoint manager 30 calls the Dcode interpreter 28 using the Dcode program associated with the address in the control point table 32. At step 608, the Dcode interpreter 28 then executes the appropriate portion of the Dcode program adapted to set an uninitialized memory watch on the address where memory has just been allocated. At step 610, the opcode stored in the control point table 32 and associated with the breakpoint address is emulated, thereby causing the continued execution of the program 20. The method 600 is exited at step 612. Returning to FIG. 4, the method 400 then proceeds from step 414 to 430 where the method 400 is exited.

Figure 7:
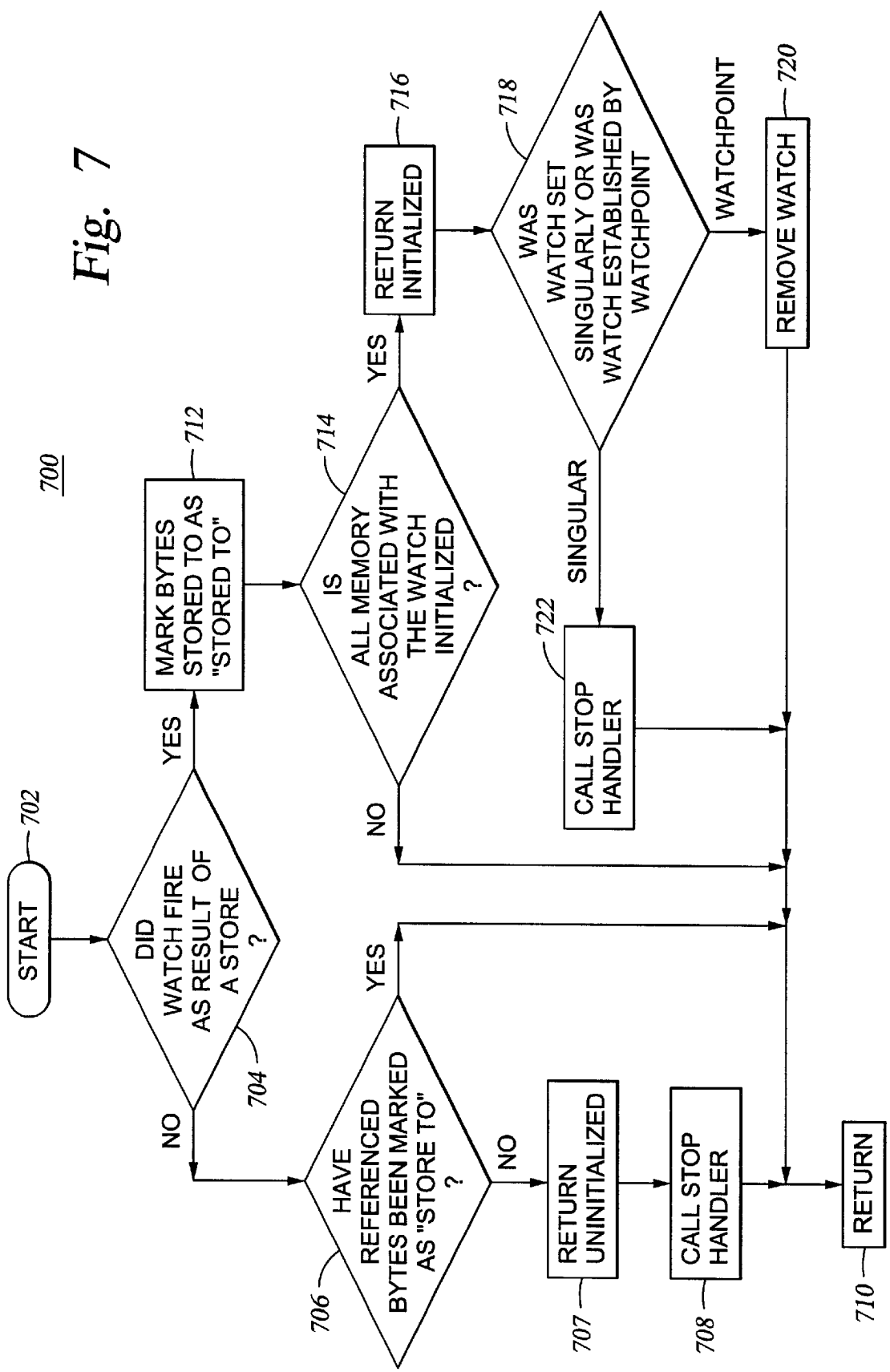
FIG. 7 is a flow diagram of the uninitialized memory watch and watchpoint processing routine.

One embodiment for processing the uninitialized memory watch at step 416 is shown as method 700 in FIG. 7. The method 700 is adapted to detect and respond to reads/loads and writes/stores to memory. The method 700 is entered from step 416 at step 702. At step 704, the method 700 queries whether the uninitialized memory watch fired as a result of a store to the memory being watched. As noted above, each portion of allocated memory is assumed to be uninitialized when the uninitialized memory watch is set. Thus, a first iteration of method 700 will typically occur as a result of a store to the memory being watched and the method 700 will proceed to step 712. The debugger program 23 then marks that part of the memory as initialized, or stored to. Accordingly, the bits contained in the bit vector field 32h are changed to reflect which watched bytes have been initialized. Thus, as each byte of the watched memory is stored to, the corresponding bit is marked accordingly.

At step 714 the method 700 determines whether all memory associated with the watch is initialized. Thus, the bit vector field 32h is accessed to determine whether each byte has been marked. If the memory is not initialized, a normal return occurs at step 710 and the program 20 continues executing until the next control point is encountered. If the memory is initialized, then the information is passed to the results buffer 36 at step 716, reflecting the initialized status of the watched memory.

Once all bytes have been stored to, the uninitialized memory watch may be terminated. The invention contemplates any variety of methods for exiting the watches. In one embodiment, additional steps are then taken according to whether the watch was a singular condition (set by a user for a specific memory space) or a watchpoint. Thus, at step 718, the method 700 queries whether the uninitialized memory watch was set singularly or by a watchpoint. In the case of a singular uninitialized memory watch, the method 700 calls the stop handler 34 at step 722. The stop handler 34 will then pass information from the results buffer 36 to the user interface 24 to notify a user that the watched memory has been initialized. The method 700 then exits at step 430 (shown in FIG. 4).

In the case of a watchpoint, the method 700 proceeds from step 718 to step 720 where the watch currently being processed is removed from the control point table 32 and any resources associated with the watchpoint are freed. The method 700 is then exited at step 710.

The invention contemplates other embodiments wherein the user is notified regarding the status of any watches. For example, in one embodiment the user may be notified at the program exit of any active watches.

If the determination at step 704 is negative, then the watch is presumed to have fired in response to a read/load from the memory. When a load is performed against the memory, the debug program 23 assumes control of the target computer program 20 and tests to determine if that part of memory had been initialized, or stored to, at step 706. This may be done by referencing the bit vector field 32h of the control point table 32. If the memory is initialized, the method 700 returns parameters reflecting the initialization and returns at step 710.

If the bytes in question have not been marked as being initialized at step 706, then at step 707, information is passed to the results buffer 36 indicating the reference to the uninitialized memory. The stop handler 34 is called at step 708 to pass the information in the results buffer 36 to the user interface 24 to notify a user that the program 20 attempted to cause a memory read/load to uninitialized memory. The method 700 is then exited at step 710.

As described above, Dcode is utilized to set and handle the watches and watchpoints of the invention. In one embodiment, the Dcode comprises two or more code segments of a single Dcode. Each segment may be adapted to handle one or more functions associated with the watch. The segments may each be identified by a unique label created by the expression evaluator 26. The labels are passed to the Dcode interpreter 28 from the breakpoint manager 30 according to the desired execution of steps. Thus, upon receiving a given label the Dcode interpreter 28 executes the corresponding segment of the Dcode. Execution of the respective segments causes the computer 10 to perform one or more steps in setting or handling the uninitialized memory watches and watchpoints. Illustratively, a single Dcode may include a SET segment, a STORE segment, a REFERENCE segment and a PAST segment. The SET segment is called to set a watch on a memory space that has been allocated (such as at step 406 and step 414). The STORE segment is called when a write is preformed against the memory space (such as step 712). The REFERENCE segment is called when a read is performed against the memory (such as step 706). The PAST segment is called when execution of the REFERENCE segment determines that the memory space was referenced (i.e., read from) before being initialized (such as step 708). Those skilled in the art will understand that the Dcode may have more or fewer Dcode segments.

In one embodiment, the uninitialized memory watches and the uninitialized memory watchpoints each have a different associated Dcode. Thus, as shown in FIG. 3, the entry illustrating an uninitialized memory watch (the first entry) contains a Dcode A in the field 32d. In contrast, the entries illustrating uninitialized memory watchpoints (the second and third entries) contain a Dcode B in the field 32d. Each of the Dcodes A and B, respectively, may have segments such as those described above. In one embodiment, the Dcodes for uninitialized memory watches and uninitialized memory watchpoints may have identical segments except that the Dcode for uninitialized memory watchpoints (Dcode B) may include an additional segment to set and handle breakpoints. Those skilled in the art will recognize other embodiments.

While the foregoing is directed to the preferred embodiment of the present invention, other and further embodiments of the invention may be devised without departing from the basic scope thereof, and the scope thereof is determined by the claims that follow.

What is claimed is:

1. A method for debugging code, comprising:

setting a watchpoint configured to cause setting of an uninitialized memory watch on a memory location upon being encountered;

in response to encountering the watchpoint during execution of the code, setting the uninitialized memory watch on the memory location, wherein the uninitialized memory watch is adapted to cause detection of a reference to the memory location during execution of the code;

when the reference is made to the memory location during execution of the code, determining whether the memory location is initialized; and if the memory location is not initialized when the reference is made, returning a result to a user interface indicating that the reference was made.

2. The method of claim 1, wherein the memory location is allocated prior to setting the uninitialized memory watch.

3. The method of claim 1, wherein the reference is a read from the memory location.

4. The method of claim 1, wherein determining whether the memory location is initialized comprises accessing a data structure configured to record stores to the memory location.

5. The method of claim 1, wherein setting the uninitialized memory watch comprises storing a variable in a data structure and mapping the variable to the memory address.

6. The method of claim 1, wherein the memory location has an address range and wherein setting the uninitialized memory watch comprises executing a debugger code (Dcode) to cause storage of the memory address range to a data structure.

7. The method of claim 1, wherein the memory location has an address range and wherein setting the uninitialized memory watch comprises setting a pointer on the memory location pointing to a variable in a data structure and mapping the variable to the memory address range, wherein the variable is set to a first value indicating that memory location is not initialized.

8. The method of claim 7, wherein the variable is changed from the first value to a second value when the memory is initialized.

9. The method of claim 7, wherein determining whether the memory is initialized comprises encountering the pointer during execution of the program and determining the value of the variable.

10. The method of claim 1, wherein determining whether the memory location is initialized comprises determining whether the memory location has been written to subsequent to setting the uninitialized memory watch and prior to the reference.

11. A method for debugging code, comprising:
setting a watchpoint configured to cause setting of an uninitialized memory watch on a selected memory location upon being encountered;
in response to encountering the watchpoint during execution of the code, setting the uninitialized memory watch on the selected memory location, which is triggered when a reference is made to the memory location;
if the reference is a write, executing a first Dcode to mark the memory location as initialized;
if the reference is a read, executing a second Dcode to determine whether the memory location is initialized; and
if the memory location is not initialized when the read is made, returning a result to a user interface indicating the reference.

12. The method of claim 11, wherein the first and second Dcodes are segments of a single Dcode.

13. The method of claim 11, wherein determining whether the memory location is initialized comprises accessing a data structure configured to record stores to the memory location.

14. The method of claim 11, further comprising, if the memory location is not initialized when the reference is made to the memory location during execution of the code, displaying the memory address on an output device.

15. The method of claim 11, wherein setting the uninitialized memory watch comprises storing a variable in a data structure and mapping the variable to the memory address.

16. The method of claim 11, wherein setting the uninitialized memory watch comprises calling a debugger code (Dcode) program which, when executed, stores the memory address range to a data structure and to store the number of bytes to be watched.

17. The method of claim 11, wherein setting the uninitialized memory watch comprises setting a pointer on the memory location pointing to a variable in a data structure and mapping the variable to the memory address range, wherein the variable is set to a first value indicating that memory location is not initialized.

18. The method of claim 17, wherein the variable is changed from the first value to a second value when the memory is initialized.

19. The method of claim 17, wherein determining whether the memory is initialized comprises encountering the pointer during execution of the program and determining the value of the variable.

20. A program product, comprising:
a debugging program, which when executed, comprises the steps:
allocating at least one memory location in a memory;
setting a watchpoint configured to cause setting of an uninitialized memory watch on a memory location upon being encountered;
in response to encountering the watchpoint during execution of the code, setting the uninitialized memory watch on the memory location, which is triggered when a reference is made to the memory location during execution of the target program;
if the reference is a write, executing a first Dcode to mark the memory location as initialized;
if the reference is a read, executing a second Dcode to determine whether the memory location is initialized;
if the memory location is not initialized when the read is made, returning a result to a user interface indicating the reference; and a computer readable medium bearing the debugging program.

21. The program product of claim 20, wherein determining whether the memory location is initialized comprises accessing a data structure configured to record stores to the memory location.

22. The program product of claim 20, wherein, if the variable is set to an initial value, the memory location is not initialized.

23. The program product of claim 20, wherein setting the uninitialized memory watch comprises storing a variable in a data structure and mapping the variable to a memory address.

24. The program product of claim 20, wherein setting the uninitialized memory watch comprises calling a debugger code (Dcode) which, when executed, stores an address range of the memory location to a data structure.

25. The program product of claim 20, wherein setting the uninitialized memory watch comprises setting a pointer on the memory location pointing to a variable in a data structure and mapping the variable to a address range of the memory location, wherein a first value of the variable indicates that memory location is not initialized and a second value of the variable indicates that memory location is initialized.

26. The program product of claim 25, wherein determining whether the memory location is initialized comprises encountering the pointer during execution of the target program and determining the value of the variable.

27. The program product of claim 20, wherein the debugger program comprises:
a user interface configured to receive input commands and output results;
an expression evaluator configured to parse the commands and generate the first and second Dcode corresponding to the commands;
a Dcode interpreter configured to cause execution of the first and second Dcode;
a breakpoint manager configured to handle setting the uninitialized memory watch and call one or more of the user interface, the expression evaluator and the Dcode interpreter.

28. The program product of claim 27, further comprising, if the memory location is initialized when the reference is made to the memory location during execution of the code, passing a return value to the user interface.

29. In a computer system comprising a memory and a processor configured for providing a system exception in response to references to the memory, a method for debugging a program executing in the processor, the method comprising:

allocating at least one memory location in the memory;

setting a watchpoint on the memory location configured to cause setting of an uninitialized memory watch on the memory location upon being encountered;

in response to encountering the watchpoint during execution of the code, setting an uninitialized memory watch on the memory location, wherein when a reference is made to the memory location the uninitialized memory watch is triggered and causes the processor to provide the system exception;

executing, by the processor, a first Dcode to mark the memory location as initialized if the reference is a write;

executing, by the processor, a second Dcode to determine whether the memory location is initialized if the reference is a read; and if the memory location is not initialized when the read is made, returning a result to a user interface indicating the reference.

30. The system of claim 29, wherein determining whether the memory location is initialized comprises accessing a data structure configured to record stores to the memory location.

31. The system of claim 29, further comprising, if the memory location is not initialized when the reference is made to the memory location during execution of the program, displaying the memory address on an output device.

32. The system of claim 29, wherein setting the uninitialized memory watch comprises storing a variable in a data structure and mapping the variable to an address range of the memory location.

33. The system of claim 29, wherein setting the uninitialized memory watch comprises calling a debugger code (Dcode) which, when executed, stores an address range for the memory location to a data structure.

34. The system of claim 29, wherein the memory location has an address range and wherein setting the uninitialized memory watch comprises setting a pointer on the memory location pointing to a variable in a data structure and mapping the variable to the address range, wherein a first value of the variable indicates that memory location is not initialized and a second value of the variable indicates that memory location is initialized.

35. The system of claim 34, wherein determining whether the memory is initialized comprises encountering the pointer during execution of the program and determining the value of the variable.

36. A method for debugging code, comprising:

setting, by a user, a watchpoint associated with a statement calling to allocate memory;

in response to encountering the watchpoint, setting an uninitialized memory watch on a memory location allocated by the statement, wherein the uninitialized memory watch is adapted to cause detection of a memory read operation to the memory location during execution of the code;

encountering the watch, whereby the memory read operation is detected;

upon detection of the memory read operation, determining whether the memory location is initialized; and if the memory location is not initialized, returning a result to a user interface indicating that the reference was made.

37. The method of claim 36, wherein the memory location is allocated prior to setting the uninitialized memory watch.

38. The method of claim 36, wherein determining whether the memory location is initialized comprises determining whether the memory location has been written to subsequent to setting the uninitialized memory watch and prior to the memory read operation.

39. A program product, comprising: a debugging program, which when executed, comprises the steps:

setting a watchpoint associated with a call in a target program to allocate memory;

in response to encountering the watchpoint during execution of the target program, setting an uninitialized memory watch on a portion of memory allocated by the call, wherein the uninitialized memory watch is triggered when a reference is made to the portion of allocated memory during execution of the target program;

if the reference is a write, executing a first Dcode to mark the allocated memory as initialized;

if the reference is a read, executing a second Dcode to determine whether the portion of allocated memory is initialized;

if the portion of allocated memory is not initialized when the read is made, returning a result to a user interface indicating the reference; and a computer readable medium bearing the debugging program.

40. The program product of claim 39, wherein determining whether the portion of allocated memory is initialized comprises accessing a data structure configured to record stores to the portion of allocated memory to determine whether the portion of allocated memory has been written to subsequent to setting the uninitialized memory watch and prior to the reference.

41. The program product of claim 39, wherein setting the uninitialized memory watch comprises storing a variable in a data structure and mapping the variable to a memory address.

42. The program product of claim 39, wherein setting the uninitialized memory watch comprises calling a debugger code (Dcode) which, when executed, stores an address range of the allocated memory to a data structure.

43. The program product of claim 39, wherein setting the uninitialized memory watch comprises setting a pointer on the allocated memory pointing to a variable in a data structure and mapping the variable to a address range of the allocated memory, wherein a first value of the variable indicates that the allocated memory is not initialized and a second value of the variable indicates that the allocated memory is initialized.

44. The program product of claim 43, wherein determining whether the allocated memory is initialized comprises encountering the pointer during execution of the target program and determining the value of the variable.

* * * * *